Figure 1:
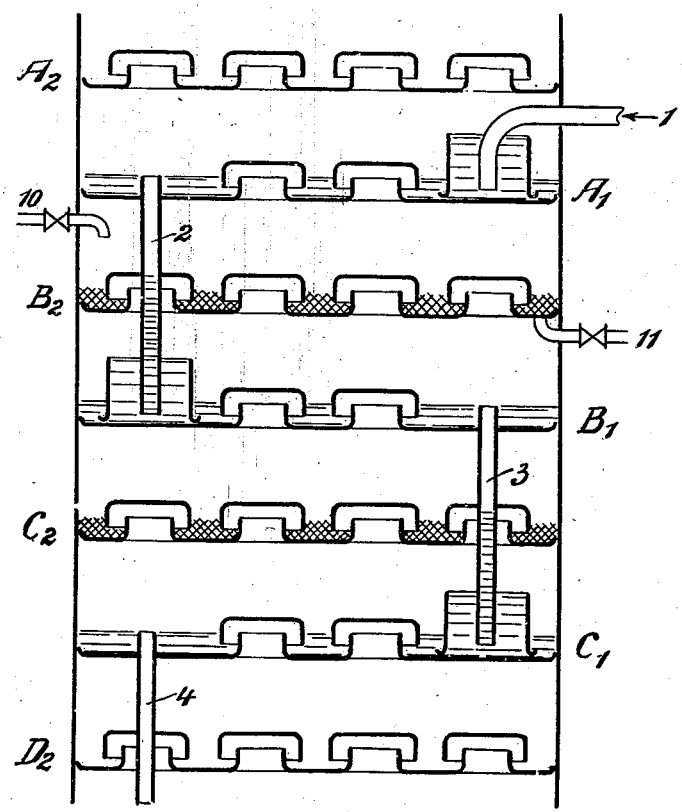

Patented May 20, 1941

2,242,267

UNITED STATES PATENT OFFICE 2,242,267

APPARATUS FOR AND METHOD OF OBTAINING OR SEPARATING VOLATILE SUBSTANCES FROM SOLUTIONS CONTAINING THE SAME

Max Seidel, Solln, near Munich, Germany

Application July 6, 1938, Serial No. 217,828
In Germany August 3, 1937

8 Claims. (Cl. 202—67)

This invention relates to an apparatus for and method of obtaining or separating volatile substances from solutions containing the same.

Prior to the present invention, the extraction of slightly volatile substances from highly diluted solutions required the entire solution to be evaporated. This procedure was neccessary both when the separation of the volatile substance from the solvent was to be effected by rectification and when the separation was to be performed by absorption, adsorption or chemical combination from vapors. When it was desired to obtain or separate only a portion of the volatile substance, it was necessary to evaporate at least an approximately equal percentage of the entire quantity of the solution.

In the case of the present invention, the solvent is caused to travel countercurrent to a relatively small amount of vapors in a rectification column. The vapors produced in the individual rectification plates are freed from the volatile substances by absorption plates (also adsorption or chemical combination) inserted between the rectification plates (through which absorption plates flow the vapors only, but not the liquid to be treated) before they reach the next rectification plate on which they are enriched again with volatile substances. Readily boiling volatile substances not absorbed by nor combined with the agents on the absorption plates are driven out of the solvent in the same process and enriched in the vapors escaping at the top of the column.

When a binary mixture containing one or more substances to be combined on the absorption plates is treated according to this invention, the simultaneous concentration of non-absorbable (non-adsorbable, non-combinable) substances in the column or in the vapors escaping from it may be omitted, and the plates of the rectification column only serve for the repeated concentration of the rising vapors with absorbable (adsorbable, combinable) volatile substances.

In this specification and the claims appended hereto, the term "rectification plates" is used generally to designate the plates on which the vapors of the column receive volatile substances from the liquid passing counter-current to the vapors through the column, and the term "absorption plates" is used to designate all column plates on which volatile substances are separated by absorption, adsorption or chemical combination by or with the rising vapors of the column.

The expression "absorption medium" is used to designate the medium which will remove, either physically or chemically (absorption, adsorption or chemical combination), the desired vaporous constituent from the vapors contacting therewith.

All the systems usable for rectification and absorption columns, for example, bells, sieves or fillers, may be used as column plates.

If the mixture to be treated contains several different volatile substances and if said substances can be obtained or removed by different absorption, adsorption or chemical combining agents, different absorption plates of a column may be respectively charged with different and appropriate absorption, adsorption or other combining agents. If the different volatile substances are to be obtained or removed separately, they may be combined successively one after the other on two or more absorption plates charged with appropriate respective binding agents and positioned between two rectification plates.

It is to be understood that this invention is not restricted to the treatment of the specific solutions hereinafter mentioned for illustrative purposes. The invention is applicable to the removal of any volatile substance from solutions containing the same. The precise absorption medium for any particular substance will be readily determined by a person skilled in the art.

In the drawings accompanying this specification and forming a part thereof—

Figure 2:
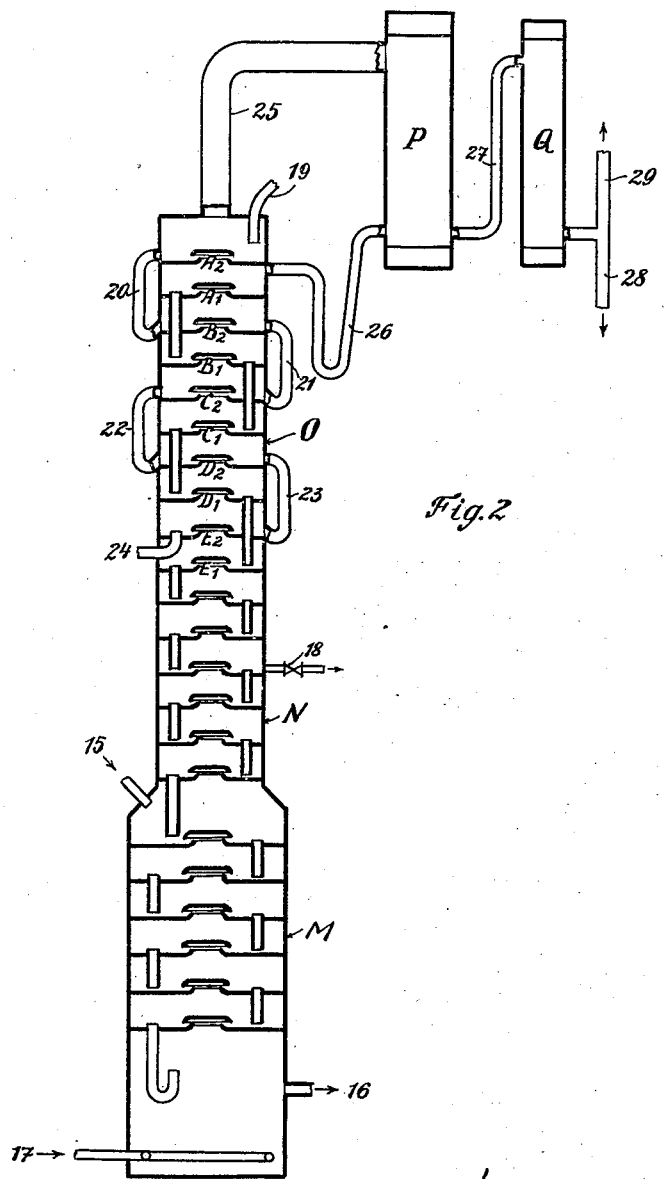

Figure 1 is a partial diagrammatic illustration, partly in section, of one embodiment of an apparatus constituting one phase of the invention, and adapted to carry out the process constituting another phase of the invention, and Figure 2 is a diagrammatic illustration of another embodiment of the invention.

Referring now to Figure 1, which shows part of a combined rectification and absorption column suitable for carrying out the process, the reference characters $A^1$, $B^1$, $C^1$, etc. designate the rectification plates, and $A^2$, $B^2$, $C^2$, etc. designate the absorption plates. Through the inlet 1 the liquid to be treated is introduced into the column or on the plate $A^1$. The vapors deprived of absorbable substances in the plate $B^2$ ascend and are enriched again at the plate $A^1$ with such substances and, upon further ascension, contact with the agent present on the plate $A^2$ which removes the absorbable substance. The liquid freed on the plate $A^1$ from part of its liquid admixtures passes through the down pipe 2 to the rectification plate $B^1$ where, in consequence of the ascending vapors, additional parts of the volatile substances evaporate and are then combined on the absorption plate $B^2$, enabling the vapors in the rectification plate $A^1$ to take up additional quantities of volatile substances. The same process is repeated on each pair of plates, causing the liquid to become poorer and poorer in volatile substances even if the latter have a higher boiling point than the principal quantity of the liquid. The vapors are enriched, while rising, with volatile substances on every plate of the rectification column up to near the saturation limit (in equilibrium with the liquid present on the plate) and give up these volatile substances more or less completely, on penetrating each absorption plate, to the absorption agent to be found there. Absorption may also be replaced by adsorption or chemical combination, e. g. to activated coal or to alkalies in the case of acids.

The down pipes 2, 3, 4, for conducting the liquid from one rectification plate to the next lower rectification plate, penetrate the absorption plates and the passage thereof through the absorption plate may be sealed by means of a liquid seal 5 and 5' which, at the same time, may serve the purpose of allowing the vapors to pass the absorption plate. However, the transfer of the liquid from one rectification plate to another rectification plate may also be effected by means of a pipe arranged outside the column.

When a liquid serves as the means of absorption it may be introduced on each absorption plate through the pipe connection 10 and after saturation discharged by the pipe connection 11, as is shown in the drawing, for example, for the plate $B^2$. When a solid means of absorption is used, filling and emtying may be effected through corresponding openings in the wall of the column.

During the absorption process, the liquid to be rectified is kept out of contact with the vapors arising from the rectification plates. The absorption medium itself never reaches the rectification plates. Rectification and absorption steps are executed several times.

The extraction of acetic acid from greatly or highly diluted aqueous solutions may be given as an example. It is true that acetic acid is volatile, but it is less volatile than water, so that the vapors exhibit a somewhat smaller acetic acid content than the liquid from which they are derived. A liquid with 0.5% of acetic acid yields vapors with about 4% of acetic acid. If 20% of its weight in vapors is sent to meet the liquid, the vapors ascending from the first plate $A^2$ of the column (to which the aqueous solution runs) contain up to about 16% of the acetic acid contained in the running solution depending on the efficiency of the plate of the column. Likewise, the vapors ascending from the rectification plate $B^1$ contain up to 16% of the acetic acid contained in the solution flowing to this plate through the down pipe 2.

If on each of the absorption plates located above the individual rectification plates all the acetic acid contained in the vapors is removed as by being combined with an appropriate agent, such as lime water, soda lye or other alkalies, the discharge of the first rectification plate $A^1$ contains only 0.84 of the entire amount of acetic acid, and the discharge of the second rectification plate $0.84^2=0.705$, therefore the discharge of the tenth rectification plate $0.84^{10}=0.175$. With only 20% of the quantity of solution to be treated in the shape of rectification vapor there may thus be obtained, with 10 double plates, up to 82.5% of the acetic acid contained in the original solution in a concentrated form combined with alkali.

With 10% vapors the percentage of acetic acid removable per double plate is 8%. With 10 double plates there are then obtained $(1-0.92^{10}) \times 100 = 54\frac{1}{2}\%$ of the acetic acid in a combined form, and with 25 double plates $(1-0.92^{25}) \times 100 = 87.5\%$.

The process may be employed specially with advantage where hitherto the extraction and separation of acetic acid and other substances had to be abandoned on account of the great expenditure of heat connected with it.

Substances not influenced by the agents (absorption, adsorption and chemical binding) provided on the absorption plates are concentrated in the vapors of the columns if they boil readily as compared with the principal quantity of the liquid to be treated. Substances with a high boiling point are concentrated in the discharge of the column. Thus, for example, acetic acid and furfurol or other low-boiling substances may be driven off or extracted separately from wood sugar worts in a single operation. The volatile acids are combined with alkalies in the absorption plates. Furfurol and other volatile substances concentrate in the de-acidified vapors escaping at the top of the column and may be extracted from them. The process may be carried out with several variations. In particular, it is possible to arrange several rectification plates or absorption plates in series so that one or several absorption plates follow one or several rectification plates. Both the rectification plates and the absorption plates may be charged continuously or periodically. The absorption plates may receive individual fillers which are changed after their action is exhausted, or the absorption agent may pass countercurrent to the vapors through all or several plates flowing down, in a manner similar to that in which the liquid to be rectified flows through the rectification plates, or the absorption agent may be conveyed in a continuous current, with the gases from burning coal, by means of pumps, etc. from bottom to top and from one plate to the next higher one, or the two possibilities may be combined in any way. The absorption, adsorption or reaction agents of the absorption plates may be liquid (soda lye), suspensions (lime water) or solids (pieces of lime). The indications in parentheses apply to the example concerning the extraction of acetic acid.

A profitable application of the new process is the production of absolute alcohol by means of dehydrating agents in one passage. In the upper part of the rectification column which otherwise concentrates spirits only up to 96%, the absorbing substances may be brought in contact with the ascending vapors on intermediate plates between the column plates proper, as is shown diagrammatically in Figure 2.

At 15 a wort or mash to be treated is introduced into the driving-off (residual) column M, where the alcohol is driven off and from which the de-alcoholized wort or mash is discharged, as at 16. The steam required for the discharge is introduced at 17 and it ascends successively through the driving-off column M, the concentrating column N and the combined absorption-rectification column O, passes through the pipe 25 to a reflux condenser P, where the necessary amount of reflux liquid is condensed and returned to the column through the pipe 26. The low-boiling part (alcohol) passes through a pipe 27 to a distilling cooler Q, from where the distillate is removed through a pipe 28, the non-condensable gases escaping through a pipe 28. At 18 a place for the removal of fusel oil is provided.

In the column O, rectification plates $A^1$, $B^1$, $C^1$, $D^1$, $E^1$ and absorption plates $A^2$, $B^2$, $C^2$, $D^2$, $E^2$ are arranged in alternate order. The absorption liquid, for example salts or glycerin dissolved in alcohol, is introduced at 19 and passes through the pipes 20, 21, 22 and 23 respectively from one absorption plate to the next lower absorption plate, flowing off at 24 after receiving the water from the alcohol vapors. The absorption agent can then be regenerated in the well-known manner and can be employed repeatedly. The column O may also be used in connection with other known distillation and rectification systems for alcohol and/or other substances.

In special cases the process can also be carried out with reduced pressure or excess pressure, if such procedure appears to be advantageous for reasons of heat economy or for other reasons. For example, the process may be used in connection with the process described in German patent application S. 122,229 IVa/12a, or if the vapor pressure conditions of the mixtures to be treated permit of a more readily decomposition at changed pressures.

A possible application of the new process is also, for example, the separation of volatile and non-volatile acids from solutions of any desired degree of dilution, e. g. the purification of lactic acid. In this example, the acetic acid, which has a higher boiling point than water, is removed from a lactic acid aqueous solution, without the ratio of concentration of the lactic acid requiring to be changed at any stage of the process. In order to be certain to avoid the formation of lactic acid anhydride, the process can be carried out at reduced pressure.

Since it is obvious that various changes and modifications may be made in the above description without departing from the nature or spirit thereof, this invention is not restricted thereto except as set forth in the appended claims.

I claim:

1. In a method of separating volatile substances contained in solutions, the steps which comprise alternately rectifying a solution containing the volatile substances, causing the vapor produced in the rectifying step to contact with an appropriate absorption medium to remove the desired volatile substance in said vapor, said absorption medium being a substance which absorbs, adsorbs, or chemically combines with the desired vaporous substance, the flow of the solution being countercurrent to the path of travel of the vapor, and removing the absorption medium when saturated with the desired volatile substance.

2. In a method of separating volatile substances contained in solutions, the steps which comprise rectifying a solution containing the volatile substances, concentrating the vapor produced in the rectifying step, causing the concentrated vapor to contact with an appropriate absorption medium to remove the desired volatile substance, said absorption medium being a substance which absorbs, adsorbs, or chemically combines with the desired vaporous substance, the flow of the solution being opposite to the path of travel of the vapor, and removing the absorption medium when saturated with the desired volatile substance.

3. In a method of separating volatile substances contained in solutions, the steps which comprise rectifying a solution containing the volatile substances, causing the vapor to contact an appropriate absorption medium to remove the desired volatile substance, said absorption medium being a substance which absorbs, adsorbs, or chemically combines with the desired vaporous substance, enriching the resulting vapor with vapor produced from another rectifying step, repeating the absorption operation, the flow of the solution being opposite to the path of travel of the vapor, and removing the absorption medium when saturated with the desired volatile substance.

4. In a method of separating a plurality of volatile substances contained in solutions, the steps which comprise alternately rectifying the solution containing the volatile substances, causing the vapor produced in the rectifying step to successively contact with appropriate absorption mediums for each of the desired volatile substances therein to successively remove the same, said absorption medium being a substance which absorbs, adsorbs, or chemically combines with the desired vaporous substance, the solution flowing in a direction opposite to the path of travel of the vapor, and removing the absorption medium when saturated with the desired volatile substance.

5. In a method of separating a plurality of volatile substances contained in solutions, the steps which comprise alternately rectifying the solution containing the volatile substances, causing the vapor produced in the rectifying step to contact with a flowing liquid absorption medium to remove the desired volatile substance, said absorption medium being a substance which absorbs, adsorbs, or chemically combines with the desired vaporous substance, the absorption medium flowing in a path countercurrent to the vapors produced in the rectifying steps, and removing the absorption medium when saturated with the desired volatile substance.

6. An apparatus for removing volatile substances from solutions comprising a plurality of rectifying plates arranged in communicative relationship with each other, a plurality of absorption plates arranged to contact with the vapor liberated by said rectifying plates, means to supply each of said absorption plates with an absorption medium which absorbs, adsorbs or chemically combines with the volatile substance in the vapors produced during rectification and desired to be removed thereby, and means to remove the absorption medium when saturated with the desired volatile substance, said rectifying and absorption plates being arranged to permit the solution to flow countercurrent to the vapors produced by the rectifying plates.

7. An apparatus for removing volatile substances from solutions comprising alternately disposed absorption plates and rectifying plates, means to supply each of said absorption plates with an absorption medium which absorbs, adsorbs or chemically combines with the volatile substance in the vapors produced during rectification and desired to be removed thereby, means to remove the absorption medium when saturated with the desired volatile substance, and means to connect said rectifying plates so that liquid may pass downwardly from one rectifying plate to another in countercurrent relationship with respect to the vapor produced by the rectifying plates.

8. An apparatus for removing volatile substances from solutions comprising alternately disposed absorption plates and rectifying plates, means to supply each of said absorption plates with an absorption medium which absorbs, adsorbs or chemically combines with the volatile substance in the vapors produced during rectification and desired to be removed thereby, means to remove the absorption medium when saturated with the desired volatile substance, and means to connect said rectifying plates so that liquid may pass downwardly from one rectifying plate to another in countercurrent relationship with respect to the vapor produced by the rectifying plates, said means comprising down tubes penetrating the absorption plate and provided with a liquid seal around the part passing through said absorption plate, said liquid seal permitting vapors to pass to said absorption plate.

MAX SEIDEL.